(12) United States Patent
Saxena et al.

(10) Patent No.: US 8,099,624 B1
(45) Date of Patent: Jan. 17, 2012

(54) RECOVERY MECHANISM FOR I/O MODULE USING OUT-OF-BAND CONTROL PATH

(75) Inventors: Mayank Saxena, Fremont, CA (US); George Kong, San Jose, CA (US); Wanye Booth, San Jose, CA (US); James Lin, Sunnyvale, CA (US); Radek Aster, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 113 days.

(21) Appl. No.: 12/557,441

(22) Filed: Sep. 10, 2009

(51) Int. Cl.
*G06F 11/00* (2006.01)
(52) U.S. Cl. .......................................................... 714/9
(58) Field of Classification Search .......... 714/9; 710/6, 710/28
See application file for complete search history.

(56) References Cited

U.S. PATENT DOCUMENTS

| | | | | |
|---|---|---|---|---|
| 5,835,566 A * | 11/1998 | Cowgill | ..................... | 379/15.01 |
| 5,983,366 A * | 11/1999 | King | ......................... | 714/38.13 |
| 6,163,815 A * | 12/2000 | Fields et al. | ..................... | 710/6 |
| 6,263,452 B1 * | 7/2001 | Jewett et al. | ..................... | 714/9 |
| 6,330,690 B1 * | 12/2001 | Nouri et al. | ..................... | 714/23 |
| 6,983,362 B1 * | 1/2006 | Kidder et al. | ..................... | 713/1 |
| 7,155,722 B1 * | 12/2006 | Hilla et al. | ..................... | 718/105 |
| 7,401,254 B2 * | 7/2008 | Davies | ............................. | 714/11 |
| 7,590,892 B2 * | 9/2009 | Sohm et al. | ................ | 714/38.13 |
| 7,660,913 B2 * | 2/2010 | Zimmer et al. | ................... | 710/6 |
| 7,688,796 B2 * | 3/2010 | Pan et al. | ...................... | 370/342 |
| 2001/0039639 A1 * | 11/2001 | Hama | ........................... | 714/764 |
| 2003/0229839 A1 * | 12/2003 | Wang et al. | ................... | 714/776 |
| 2005/0005196 A1 * | 1/2005 | Bune | ............................... | 714/18 |
| 2005/0039070 A1 * | 2/2005 | Ittycheriah et al. | ............... | 714/4 |
| 2005/0278563 A1 * | 12/2005 | Durham et al. | .................... | 714/4 |
| 2008/0052394 A1 * | 2/2008 | Bugenhagen et al. | ........ | 709/224 |
| 2009/0201805 A1 * | 8/2009 | Begen et al. | .................. | 370/225 |

* cited by examiner

*Primary Examiner* — Amine Riad
(74) *Attorney, Agent, or Firm* — Blakely, Sokoloff, Taylor & Safman LLP (57) ABSTRACT

A storage system includes a storage server and a storage subsystem having an I/O module coupled to disks. The storage server includes a storage adapter coupled to the I/O module creating an in-band (data) path to access data stored on the disks. The storage server sends a data command through the in-band path to the I/O module for accessing the data stored on the disks. The storage server further includes a network adapter coupled to the I/O module creating an out-of-band control path to control the I/O module. The storage server detects through the in-band path that the I/O module is nonresponsive to a data command and automatically changes the behavior of the I/O module (e.g., resets the I/O module) through the out-of-band control path to recover the nonresponsive I/O module. The storage server also collects and outputs status data of the I/O module through the out-of-band control path.

24 Claims, 7 Drawing Sheets

RECOVERY MECHANISM FOR I/O MODULE USING OUT-OF-BAND CONTROL PATH

This invention relates generally to recovering an I/O module in a storage system, and more particularly to improve the resiliency of the I/O module in the storage system using an out-of-band control path.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2008, NetApp, Inc., All Rights Reserved.

BACKGROUND OF THE INVENTION

Various forms of network-based storage systems exist today. These forms include network attached storage (NAS), storage area networks (SANs), and others. Network storage systems are commonly used for a variety of purposes, such as providing multiple users with access to shared data, backing up critical data (e.g., by data mirroring), and the like.

A network-based storage system typically includes at least one storage server, which is a processing system configured to store and retrieve data on behalf of one or more client processing systems ("clients"). A storage server operates on behalf of one or more clients to store and manage shared files. The files may be stored in a storage subsystem that includes one or more arrays of mass storage devices, such as magnetic or optical disks or tapes, by using RAID (Redundant Array of Inexpensive Disks). Hence, the mass storage devices in each array may be organized into one or more separate RAID groups. A storage server provides clients with file-level access. Some storage servers may additionally provide block-level access.

Current storage systems are generally packaged in either of two main forms: 1) an all-in-one custom-designed system that is essentially a standard computer with built-in disk drives, all in a single chassis ("enclosure"), or 2) a modular system in which one or more sets of disk drives, each in a separate chassis, are connected to an external storage server in another chassis. A modular system can be built up by adding multiple chassis in a rack, and then cabling the chassis together. The disk drive enclosures in a module system are often called "shelves," "storage shelf," or "storage shelves."

A client can send a request to a storage server to access data stored on disks in a storage subsystem. The storage server includes a storage adapter coupled to an I/O module in the storage subsystem that creates an in-band communications path, also known as a data path, to access the data stored on the disks. An I/O module can receive and process a request through the in-band path. An I/O module, however, may be non-responsive to a request which can result in a time-out. There is not, however, a means for controlling a non-responsive I/O module independent of the in-band path.

SUMMARY OF THE INVENTION

A storage system includes a storage server coupled to a storage subsystem having an I/O module coupled to a number of disks. The storage server includes a storage adapter coupled to an I/O module in the storage subsystem creating an in-band communication path, also known as a data path, to access data stored on the disks. The storage server sends a data command, such as a read command, to the I/O module in the storage subsystem through the in-band (data) path. The storage server further includes a network adapter coupled to the I/O module creating an out-of-band control path to control the I/O module. The storage server detects through the in-band path that the I/O module is non-responsive to the data command and automatically changes the behavior of the I/O module through the out-of-band control path to recover the non-responsive I/O module. The storage server sends a control command, such as a reset command, to the I/O module through the out-of-band control path to change the behavior of the I/O module (e.g., reset the I/O module) to recover the non-responsive I/O module. The storage server further determines through the in-band path whether the I/O module is non-responsive to the control command. If the I/O module continues to be non-responsive, the storage server further sends a different control command, such as a power cycle command, to the I/O module through the out-of-band control path. If the I/O module is responsive, the storage server obtains status data of the I/O module through the out-of-band control path. The storage server further outputs the I/O module status data to an administrator for analysis.

The present invention is described in conjunction with systems, clients, servers, methods, and computer-readable media of varying scope. In addition to the aspects of the present invention described in this summary, further aspects of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

An in-band path, also known as a data path, is a communications path to access data stored on disks in a storage subsystem. A storage server sends client requests to a storage subsystem through the in-band (data) path for accessing data stored on disks in the storage subsystem. The disks are coupled to an I/O module in the storage subsystem. The I/O module receives and processes a data request through the in-band path. An I/O module, however, may be non-responsive to the request, which can result in a time-out. The control architecture of the present invention provides the ability to automatically change the behavior of a non-responsive I/O module to recover the non-responsive I/O module (e.g., by resetting or power cycling the non-responsive I/O module) through an out-of-band control path. An Out-of-Band Control Path (OOBCP) is a communications path, which is independent of the in-band (data) path, for controlling an I/O module. The control architecture further provides storage administrators the ability to access status data of the I/O module through the out-of-band control path for analysis.

Figure 1:
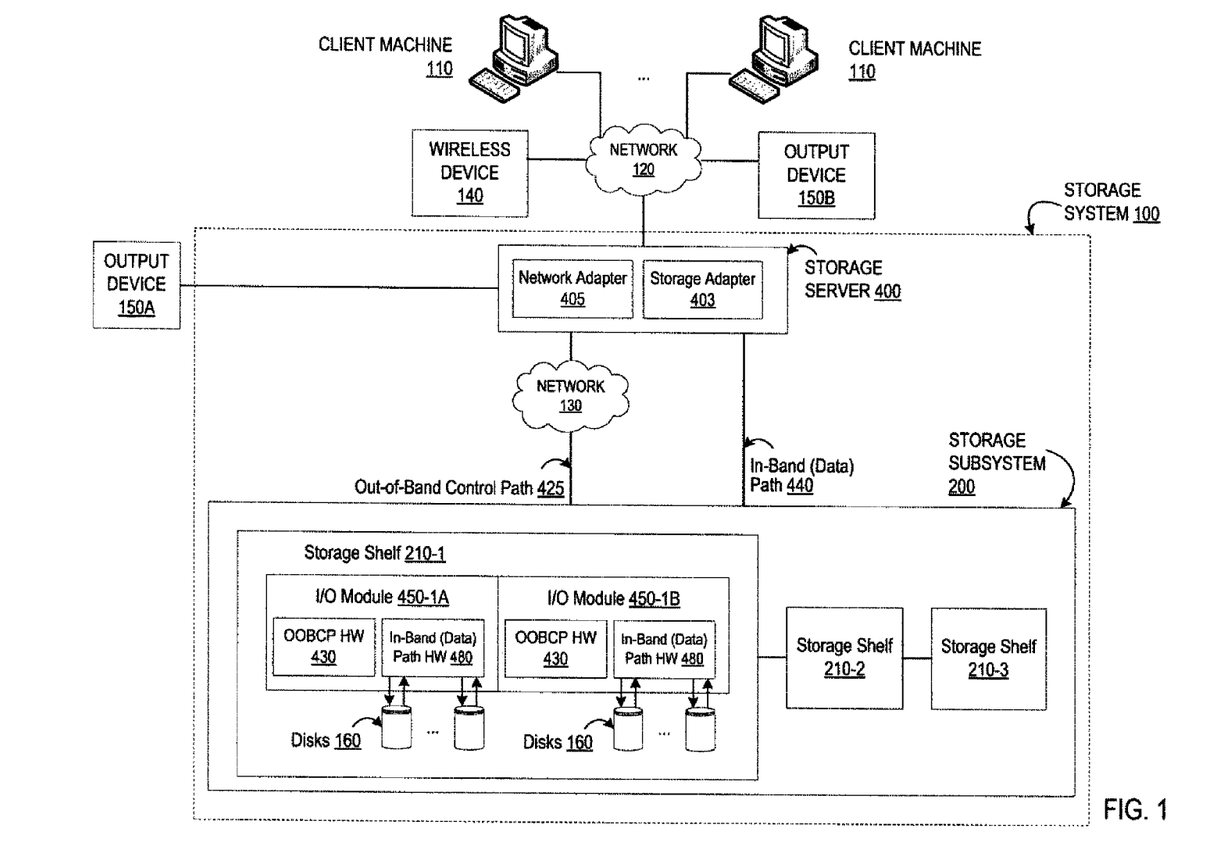
FIG. 1 illustrates an embodiment of a networked storage system.

FIG. 1 shows a network storage system 100 according to some embodiments of the control architecture. FIG. 1 shows an example of a network environment in which a storage server 400 operates. The storage server 400 can be a file server in which the control architecture can be implemented. It should also be noted that the control architecture can be applied in other types of storage systems, such as storage servers, which provide clients with either or both block-level access and file-level access to stored data, or processing systems other than storage servers, and network devices configured to provide storage services.

The storage server 400 is coupled to a storage subsystem 200 which includes an array of mass storage devices 160 (e.g., disks), and to a set of storage client machines 110 (hereinafter simply "clients") through a network 120. The network 120 may be, for example, a local area network (LAN), a wide area network (WAN), a metropolitan area network (MAN), a wireless network, a global area network (GAN) such as the Internet, a Fibre Channel fabric, or the like, or a combination of any such types of networks. The network 120 can include any number of networking and computing devices such as wired and wireless devices 140. Each of the clients 110 can be, for example, a conventional personal computer (PC), server-class computer, workstation, or the like.

In one embodiment, the storage server 400 and the storage subsystem 200 form a modular system in which one or more sets of mass storage devices 160 (disks 160), each in a separate chassis ("enclosure"), are connected to the storage server 400 in another chassis via network 130. The network 130 can be, for example, a local area network (LAN), a wide area network (WAN), a metropolitan area network (MAN), a wireless network, a global area network (GAN) such as the Internet, a Fibre Channel fabric, or the like, or a combination of any such types of networks. The mass storage devices 160 in the storage subsystem 200 can be, for example, conventional magnetic disks, optical disks such as CD-ROM or DVD-based storage, magneto-optical (MO) storage, or any other type of non-volatile storage devices suitable for storing large quantities of data. In one embodiment, the mass storage devices 160 are each a flash-based solid-state device (SSD), sometimes known as flash drives. The disks 160 can further be organized as a Redundant Array of Inexpensive Disks/Devices (RAID), whereby the storage server 400 accesses the disks 160 using one or more RAID protocols known in the art.

It will be appreciated that certain embodiments of the present invention may be implemented with solid-state memories including flash storage devices constituting storage array (e.g., disks 160). For example, a storage server (e.g., storage server 400) may be operative with non-volatile, solid-state NAND flash devices which are block-oriented devices having good (random) read performance, i.e., read operations to flash devices are substantially faster than write operations. Data stored on a flash device are accessed (e.g., via read and write operations) in units of pages, which in the present embodiment are 4 kB in size, although other page sizes (e.g., 2 kB) may also be used.

When the flash storage devices are organized as one or more parity groups in a RAID array, the data is stored as stripes of blocks within the parity groups, wherein a stripe may constitute similarly located flash pages across the flash devices. For example, a stripe may span a first page 0 on flash device 0, a second page 0 on flash device 1, etc. across the entire parity group with parity being distributed among the pages of the devices. Note that other RAID group arrangements are possible, such as providing a RAID scheme wherein every predetermined (e.g., 8th) block in a file is a parity block.

The enclosures for the disks 160 are herein referred to as "shelves," "storage shelf," or "storage shelves." The storage server 400 is coupled to a number of the external storage shelves 210-1 to 210-3. Each storage shelf 210-1 to 210-3 contains multiple disks 160 operated under control of the storage server 400 according to RAID protocols and includes at least one I/O module 450-1A. For example, the storage shelf 210-1 includes two I/O modules 450-1A and 450-1B. I/O module 450-1B is a partner module to I/O module 450-1A and I/O module 450-1A is a partner module to I/O module 450-1B. An I/O module 450-1A, 450-1B serves as a communications interface between the storage server 400 and the disks 160 in the storage shelf 210-1. The disks 160 in the storage shelf 210-1 can be connected to the I/O module 450-1 by a standard Fibre Channel connection.

The storage subsystem 200 is managed by the storage server 400. The storage server 400 receives and responds to various read and write requests from the clients 110, that are directed to data stored in, or to be stored in, the mass storage devices 160 in the storage subsystem 200. The storage server 400 includes a storage adapter 403 coupled to the I/O modules 450-1A, 450-1B in the storage subsystem 200 creating an in-band (data) path 440 to access the data stored in, or to be stored in, the mass storage devices 160. The storage adapter 403 is coupled to in-band (data) path hardware 480 on the I/O modules 450-1A, 450-1B to create the in-band path 440. The storage server 400 also includes a network adapter 405 coupled to out-of-band control path (OOBCP) hardware 430 on the I/O modules 450-1A, 450-1B creating an out-of-band control path 425 to control the I/O modules 450-1A, 450-1B and to access status data (not shown) of the I/O modules 450-1A, 450-1B. The storage server 400 outputs I/O module status data to one or more clients 110 and wireless devices 140. The storage server 400 also outputs I/O module status data to an output device 150A,B (e.g., display unit, printer) coupled to the storage server 400. The storage server 400 is locally coupled to an output device 150A or communicates to an output device 150B via network 120. The storage server 400 can also be coupled through a switching fabric to other similar storage servers (not shown), which have their own local storage subsystems. In this way, all of the storage subsystems 200 can form a single storage pool, to which any client of any of the storage servers has access.

Figure 2:
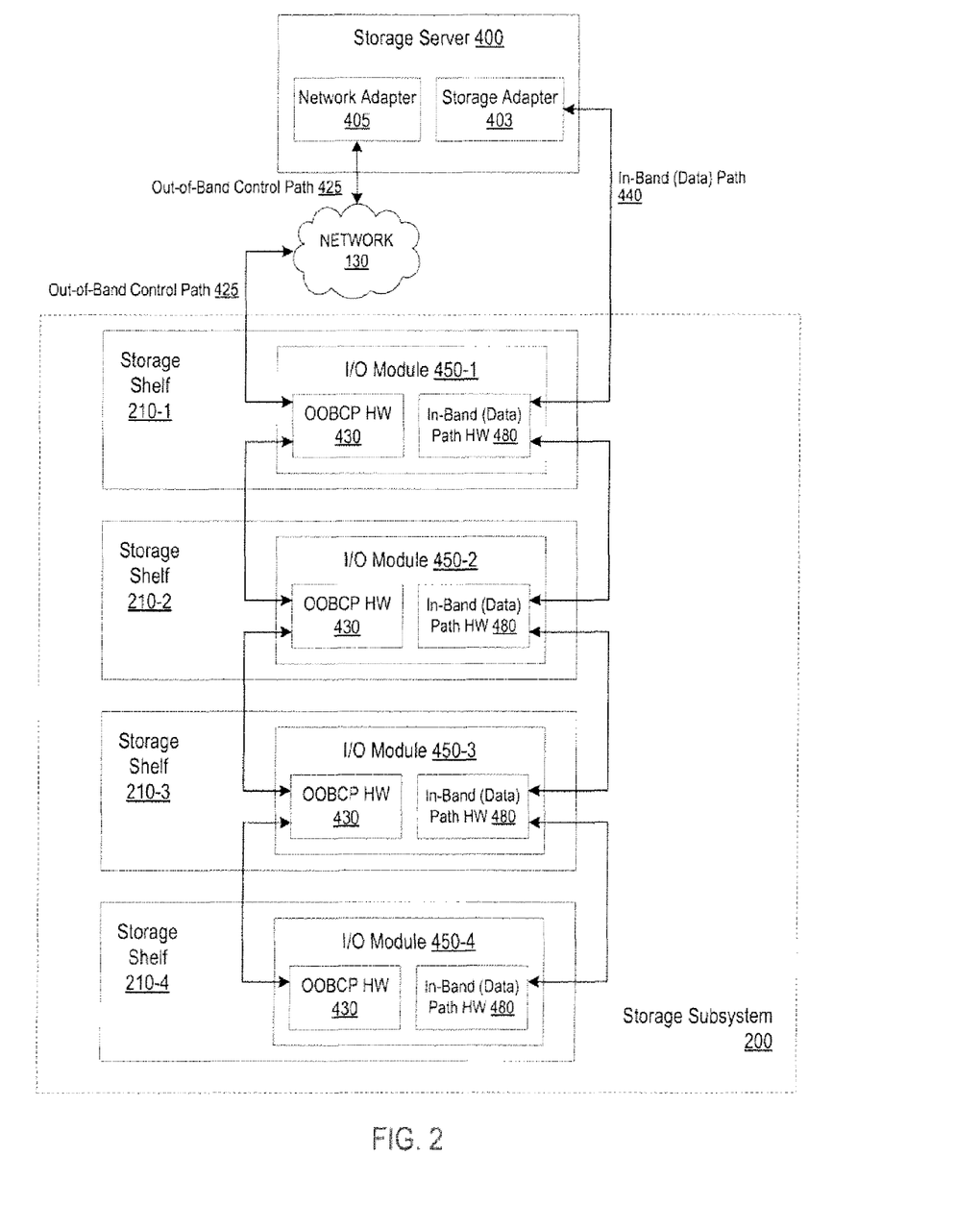
FIG. 2 illustrates another embodiment of a networked storage system.

FIG. 2 shows a simple networked storage system configuration characterized by a storage server 400 coupled to four external storage shelves 210-1 to 210-4, illustratively, in a loop topology via network 130. A person of ordinary skill in the art would appreciate that the control architecture described herein can be applied to any storage shelf topology, including, but not limited to, Fibre Channel-Arbitrated Loop (FC-AL), Serial Attached Small Computer System Interface (SAS), Internet Small Computers Systems Interface (iSCSI), and the like. There can be a greater or smaller number of storage shelves 210-1 to 210-4 in the loop, there can be more than one loop attached to the storage server 400, or there can be one loop for every storage shelf 210-1 to 210-4.

In the embodiment of FIG. 2, each of the storage shelves 210-1 to 210-4 has the same construction. Each storage shelf 210-1 to 210-4 includes multiple disks and at least one I/O module 450-1, which is connected between two adjacent storage shelves in the loop, or, depending on where the shelf is placed in the loop, is connected between an adjacent storage shelf 210-1 and the storage server 400. For example, I/O module 450-2 is connected between storage shelf 210-1 and storage shelf 210-3, and I/O module 450-1 is connected between storage shelf 210-2 and storage server 400. Although not illustrated in FIG. 2, each storage shelf 210-1 to 210-4 includes two I/O modules, such as I/O module 450-1A in FIG. 1 and its partner I/O module 450-1B.

The storage server 400 includes a storage adapter 403 coupled to, for example, I/O module 450-1 in the storage subsystem 200 creating an in-band path 440 to access the data stored in the mass storage devices in storage shelf 210-1. The storage adapter 403 couples to in-band (data) path hardware 480 on I/O module 450-1 to create the in-band path 440. For example, the in-band path 440 can be created using Serial Attached SCSI (SAS) cables. The in-band path hardware 480 on storage shelf 210-1 can further be coupled to in-band path hardware 480 on another storage shelf 210-2.

The network adapter 405 on storage server 400 is coupled to OOBCP hardware 430 on I/O module 450-1 creating an out-of-band control path 425 to control the I/O module 450-1 and to access status data of the I/O module 450-1. The OOBCP hardware 430 on the I/O module 450-1 can further be coupled to OOBCP hardware 430 on another storage shelf 210-2. The network cabling (e.g., Ethernet cables) coupling the I/O modules and storage server 400 creates a complete network (e.g., Ethernet network) independent of the in-band path 440. This independent network creates the out-of-band control path 425 for automatically controlling the I/O modules 450-1 to 450-4.

Figure 3:
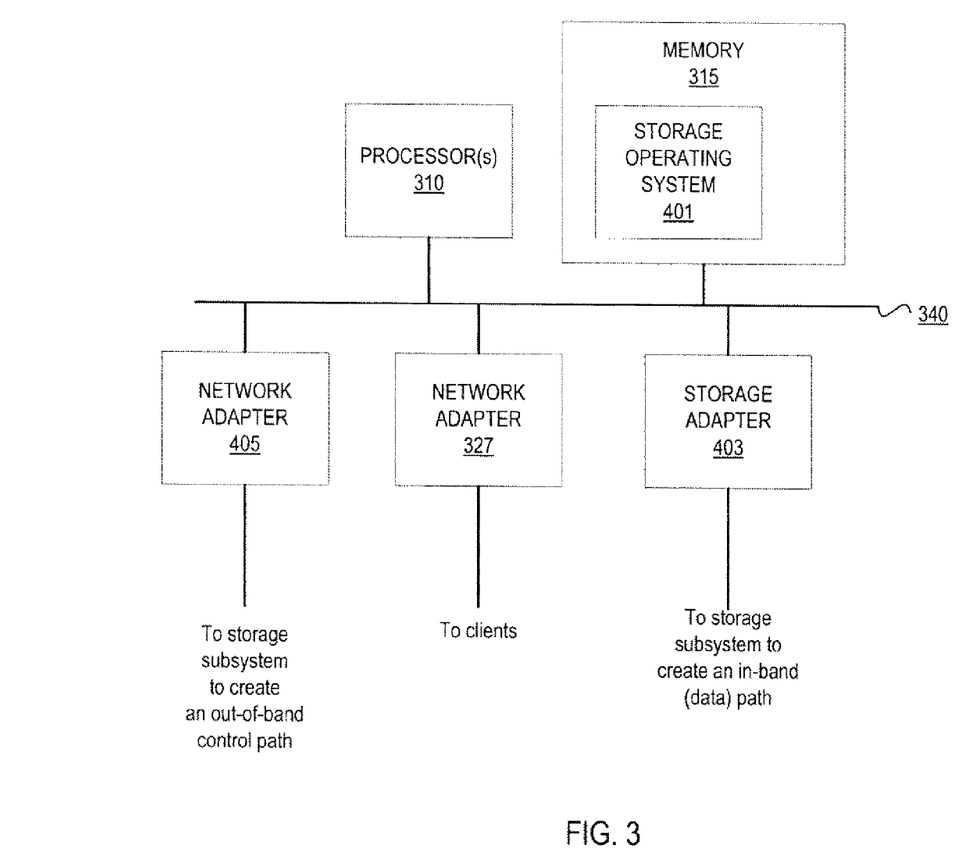
FIG. 3 illustrates an embodiment of the hardware architecture for implementing an out-of-band control path from a storage server to an I/O module in a storage subsystem.

FIG. 3 is a high-level block diagram showing an example of the architecture for a storage server which implements an out-of-band control path mechanism for controlling an I/O module on a storage subsystem in a network storage system. The storage server includes one or more processors 310 and memory 315 connected via an interconnect 340. Interconnect 340 represents any one or more separate physical buses, point to point connections, or both connected by appropriate bridges, adapters, or controllers. Interconnect 340, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire."

Processor(s) 310 may include central processing units (CPUs) of storage server 400 and thus controls the overall operations of storage server 400. In certain embodiments, processor(s) 310 accomplish this by executing firmware or software stored in memory 315. Processor(s) 310 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 315 is, or includes, the main memory of storage server 400. Memory 315 represents any form of random access memory (RAM), read-only memory (ROM), or the like. In use, memory 315 may contain a set of computer-executed instructions which, when executed by processor(s) 310, causes processor(s) 310 to perform operations to implement aspects of the present invention. In one embodiment, the out-of-band control path mechanism resides in memory 315 enabling storage server 400 to control an I/O module through an out-of-band control path as further discussed herein. The out-of-band control mechanism may be implemented in computer-executable software, firmware, hardware or some combination thereof, and is discussed further in reference to FIG. 4.

Network adapter 327 communicates with remote devices, such as clients 110 over network 120 of FIG. 1, to receive data access requests from the remote devices. Storage adapter 403 creates an in-band (data) path to a storage subsystem and allows processor(s) 310 to access mass storage devices (e.g., disks 160 in FIG. 1) in the storage subsystem. The storage adapter 403 can be, for example, a Fibre Channel adapter a SCSI adapter, for servicing client requests received via network adapter 327. Network adapter 405 connects to processor(s) 310 through interconnect 340. Network adapter 405 creates an out-of-band control path to a storage subsystem and provides the storage server the ability to communicate with I/O modules in the storage subsystem, such as I/O modules 450-1 to 450-4 in FIG. 2. The network adapter 405 can be, for example, an Ethernet adapter or Fibre Channel adapter.

Although illustrated as a self-contained element, the storage server may have a distributed architecture. For example, the storage server may include a separate N-("network") module (not shown) and D-("data") module (not shown). In such an embodiment, the N-module is used to communicate with remote devices, such as clients 110 over network 120 of FIG. 1, while the D-module includes the file system functionality and is used to communicate with an associated storage subsystem. The N-module and D-module can communicate with each other using an internal protocol. One embodiment of this invention can be operative in that the D-module is coupled to an I/O module, such as I/O module 450-1A in FIG. 4 described in greater detail below, and the Out-of-band Control Path Administrator (e.g., OOBCPA 420 in FIG. 4 described in greater detail below) can be executed by a processor of the D-module. Alternatively, the storage server can have an integrated architecture, where the network and data components are all contained in a single box, for example, as illustrated in FIG. 3.

Figure 4:
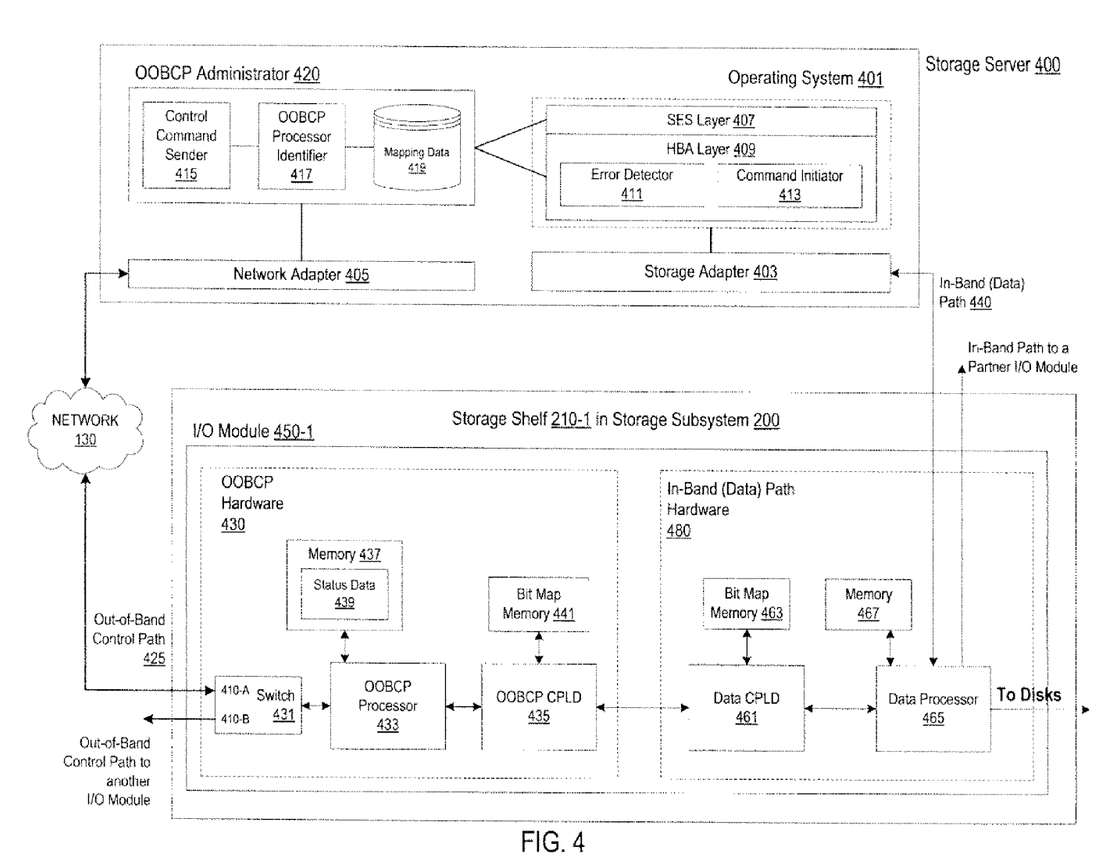
FIG. 4 illustrates an embodiment of a control architecture in a storage server for controlling an I/O module.

FIG. 4 shows the administration of an out-of-band control path 425 implemented in a storage server 400 and the execution of control commands through the out-of-band control path 425 in storage subsystem 200 according to one embodiment. Storage server 400 illustrates an example of the storage operating system 401 for controlling the operations of the storage server 400. In one embodiment, the storage server 400 is a storage server product of NetApp, Inc., Sunnyvale, Calif., that uses the NetApp® Data ONTAP™ storage operating system. However, it is expressly contemplated that any appropriate storage server and storage operating system can be enhanced for use in accordance with the control architecture described herein. The storage operating system 401 and its constituent elements are preferably implemented in the form of software. However, in some embodiments, some or all of the elements of the operating system 401 may be implemented in the form of hardware (e.g., specially designed circuitry), or as a combination of hardware and software.

As shown, the storage operating system 401 includes several modules, or "layers." The storage operating system 401 includes a host bus adapter (HBA) layer 409, and a SCSI Enclosure Service (SES) layer 407 that enables the storage server 400 to communicate with the storage shelf 210-1 for processing a client-initiated data command, such as a read or write request. The SES layer 407 tracks which I/O modules are coupled to the storage adapter 403 in the storage server 400. The HBA layer 409 is the interface that passes data commands (e.g., read command, write command) from the storage server 400 to an I/O module 450-1. The HBA layer 409 passes data commands through the storage adapter 403. The HBA layer 409 receives a request from a client, such as client 110 in FIG. 1, to access data stored on disks, such as disks 160 in FIG. 1. To access the data stored on the disks, the HBA layer 409 includes a command initiator 413 to send a data command to a data processor 465 on the I/O module 450-1 through in-band path 440. The HBA layer 409 further includes an error detector 411 to detect whether the I/O module 450-1 is non-responsive to the data command sent by the command initiator 413. The command initiator 413 and the error detector 411 can be implemented as hardware, computer-implemented software, firmware or a combination thereof. In one embodiment, the command initiator 413 and the error detector 411 comprise instructions stored in memory 315 that cause processor 310 in FIG. 3 to perform the functions of the command initiator 413 and the error detector 411.

The storage server 400 includes an out-of-band control path administrator ("OOBCPA") 420 to automatically recover the I/O module 450-1. The OOBCPA 420 interfaces with the SES layer 407 and the HBA layer 409 of the operating system 401. The error detector 411 of the HBA layer 409 sends a signal to the OOBCPA 420 indicating that an error has occurred (e.g., a timeout) and that an I/O module 450-1 is non-responsive to a data command. The signal includes data identifying the non-responsive I/O module. The command initiator 413 of the HBA layer 409 sends a control command to the OOBCPA 420 causing the data processor 460 on the identified I/O module 450-1 to change the behavior of the I/O module 450-1 in an attempt to recover the non-responsive I/O module. For example, the command initiator 413 sends a reset command to the OOBCPA 420 causing the data processor 465 to reset the I/O module 450-1. In another example, the command initiator 413 sends a power cycle command to the OOBCPA 420 causing the data processor 465 to power cycle the I/O module 450-1.

Each I/O module 450-1 includes a switch 431 coupling the I/O module 450-1 in the storage subsystem 200 to a network adapter 405 in the storage server 400. In one embodiment, the switch 431 is an Ethernet switch on-board the I/O module 450-1. The switch 431 is coupled to the storage server 400 via Ethernet cabling creating an out-of-band control path 425. In other embodiments, the switch 431 uses networking technology other than Ethernet (e.g., fiber channel) to create a network coupling OOBCP processors (e.g., OOBCP processor 433) to the storage server 400 independent of the network coupling data processors (e.g., data processor 465) to the storage server 400. Regardless of the protocol, the switch 431 can have an input port 410-A and an output port 410-B. In still other embodiments, the switch 431 can have more than two ports. The output port 410-B is coupled to an input port on a switch of another I/O module (e.g., I/O module 450-2 on storage shelf 210-2 in FIG. 2). The input port 410-A is coupled to a network adapter 405 in the storage server 400.

The OOBCPA 420 maintains data of all of the OOBCP processors coupled to the storage server 400 (e.g., OOBCP processors in storage shelves 210-1 to 210-4 in FIG. 2). The OOBCPA 420 maintains data 419 that maps each OOBCP processor to a corresponding port on an I/O module 450-1. For example, OOBCP processor 433 corresponds to port 1 (410-A) on I/O module 450-1. The mapping data 419 can be in the form of a mapping table, such as a routing table. In one embodiment, the mapping data 419 is stored in memory 315 on the storage server 400. When the OOBCPA 420 receives a signal from the HBA layer 409 identifying a non-responsive I/O module, the OOBCP processor identifier 417 accesses the mapping data 419 to determine the port corresponding to the OOBCP processor on the non-responsive I/O module. The control command sender 415 sends a control command, such as a reset command, to the corresponding port 1 (410-A) on the identified I/O module 450-1 through the out-of-band control path 425. The OOBCP processor identifier 417 and the control command sender 415 can be implemented as hardware, computer-implemented software, firmware or a combination thereof. In one embodiment, the OOBCP processor identifier 417 and the control command sender 415 comprise instructions stored in memory 315 that cause processor 310 in FIG. 3 to perform the functions of the OOBCP processor identifier 417 and the control command sender 415.

In the embodiment of FIG. 4, an I/O module 450-1 includes out-of-band control path (OOBCP) hardware 430 for controlling the I/O module 450-1 and in-band path hardware 480 for accessing data stored on disks (not shown) coupled to data processor 465. The in-band path hardware 480 includes a data Complex Programmable Logic Device (data CPLD) 461, data processor 465, and memory 467. The out-of-band control path hardware 430 includes a switch 431, OOBCP processor 433, and an OOBCP CPLD 435. The input port 410-A on the switch 431 receives a control command from the storage server 400 through the out-of-band control path 425. The OOBCP processor 433 obtains the control command from the switch 431 and causes the data processor 465 to execute the control command for changing the behavior of the I/O module 450-1, such as causing the I/O module to reset or power cycle. The OOBCP processor 433 causes the data processor 465 to change the behavior (e.g., reset, power cycle) of the I/O module 450-1 through the OOBCP CPLD 435 and the data CPLD 461. The OOBCP CPLD 435 and the data CPLD 461 contain programmable logic to implement a specific design feature. The OOBCP CPLD 435 includes bit map memory 441 for programming the OOBCP CPLD 435. The data CPLD 461 also includes bit map memory 463 for programming the data CPLD 461.

The OOBCP processor 433 programs the OOBCP CPLD 435 to program the data CPLD 461. The OOBCP processor 433 programs the OOBCP CPLD 435 by setting one or more bits in the bit map memory 441 of the OOBCP CPLD 435. The OOBCP CPLD 435 programs the data CPLD 461 to cause the data processor 465 to execute the control command. The OOBCP CPLD 435 programs the data CPLD 461 by setting one or more bits in the bit map memory 463 of the data CPLD 461. For example, the control command may be a reset command and the OOBCP CPLD 435 sets one or more bits in bit map memory 463 programming the data CPLD 461 to cause the data processor 465 to reset the I/O module 450-1. In another example, the control command may be a power cycle command. The OOBCP CPLD 435 programs the data CPLD 461 to cause the data processor 465 to power cycle the I/O module 450-1.

The OOBCP hardware 430 includes memory 437 coupled to the OOBCP processor 433 to store data. For example, the memory 437 stores status data 439 of the I/O module. The I/O module status data 439 includes post-data stored in the memory 437 after the behavior of the I/O module has been changed (e.g., the I/O module has been reset or power cycled). Examples of I/O module status data 439 include connection data, I/O module firmware version data, I/O module logs, voltage status data, I/O module core dump data, and SAS address data. In other embodiments, the I/O module status data can include less or more types of data. The in-band path hardware 480 includes memory 467 coupled to the data processor 465 to store data associated with the data processor 465 and data associated with the disks (e.g., disks 160 in FIG. 1) coupled to the data processor 465.

Figure 5:
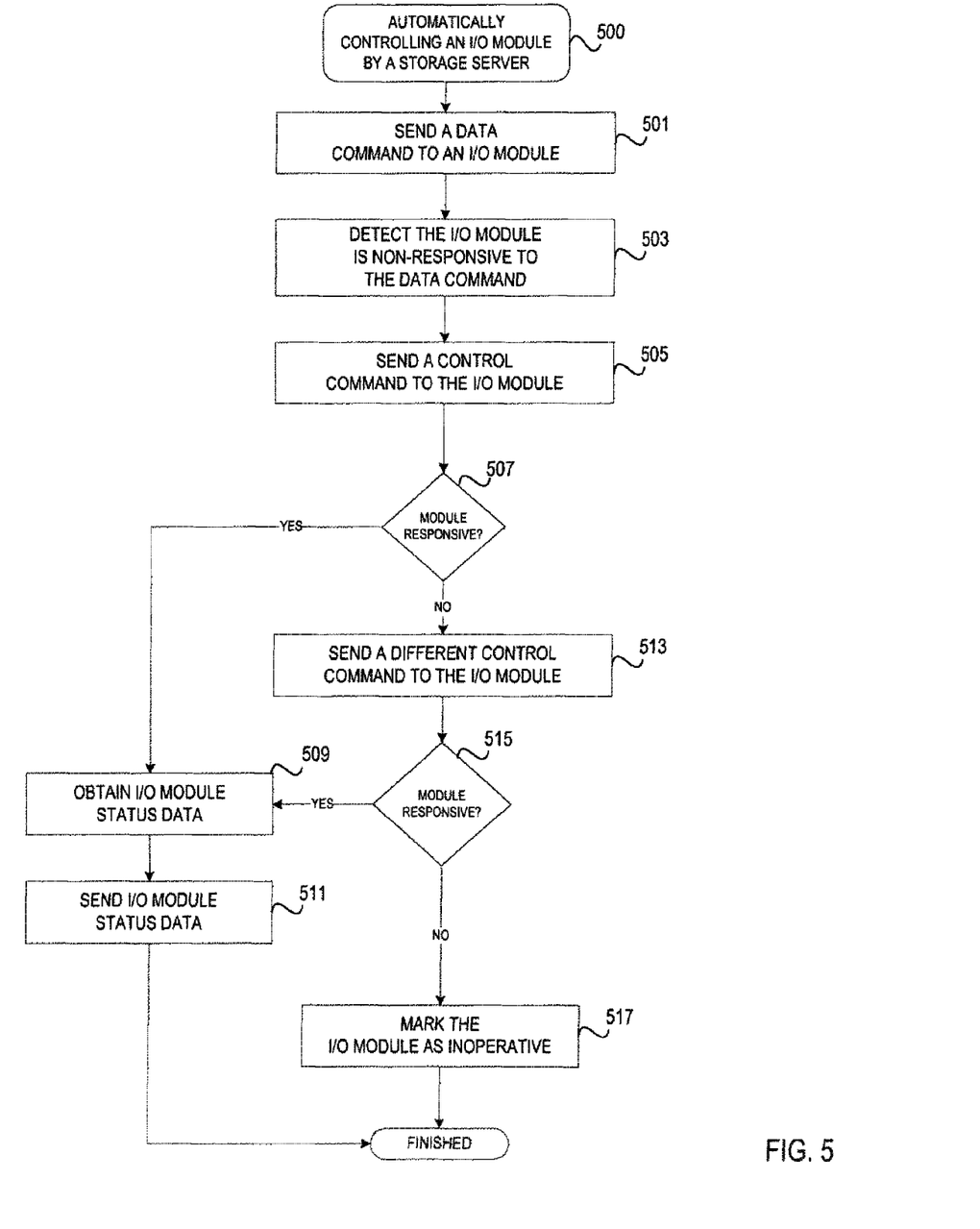
FIG. 5 illustrates a flowchart of a method for automatically controlling an I/O module to be performed by a storage server according to one embodiment.
Figure 6:
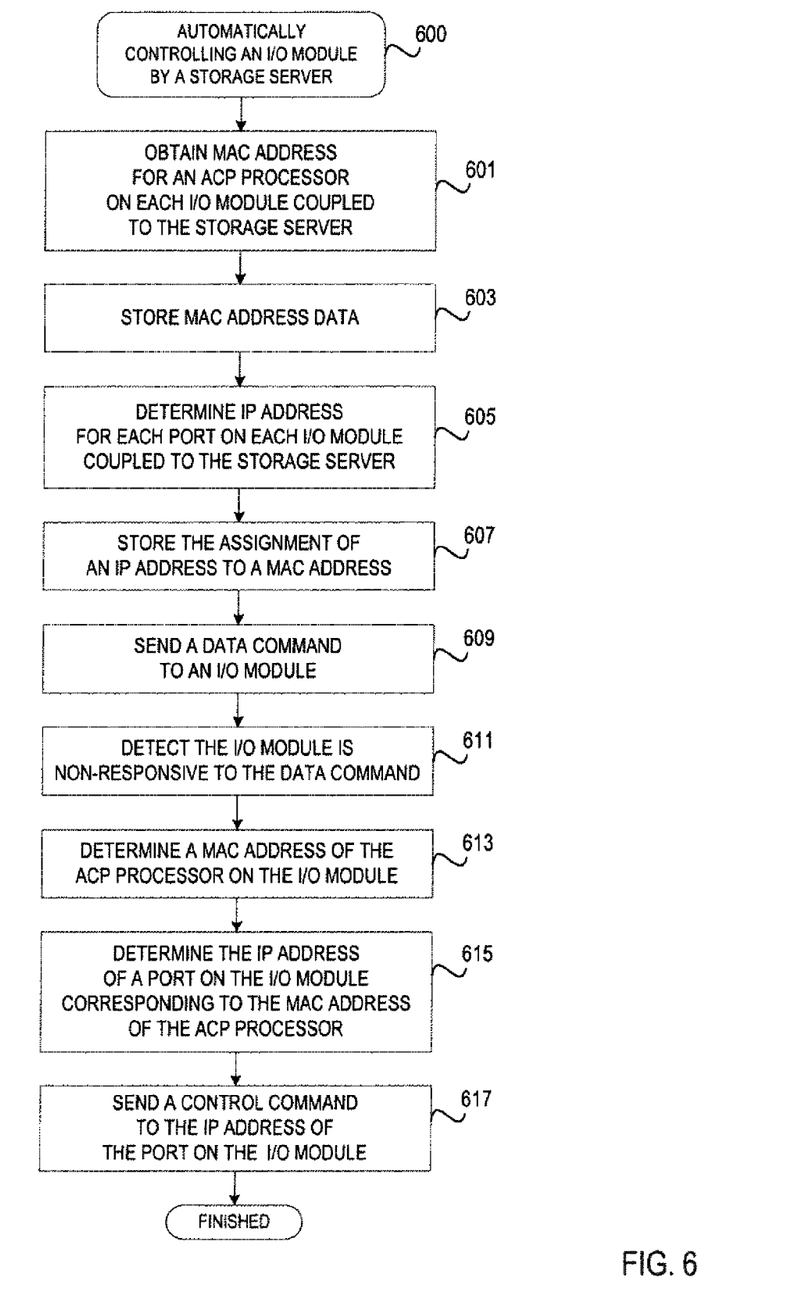
FIG. 6 illustrates a flowchart of a method for automatically controlling an I/O module to be performed by a storage server according to one embodiment.

FIG. 5 illustrates a flowchart for a method 500 for automatically controlling an I/O module to be performed by a storage server, such as storage server 400, according to one embodiment. Examples of controlling an I/O module include changing the behavior of an I/O module, such as resetting an I/O module, power cycling an I/O module, and obtaining status data of the I/O module. At block 501, the method 500 sends a data command, such as a read command, to an I/O module in a storage subsystem to access data stored in disks. At block 503, the method detects through an in-band path coupling the storage server to the I/O module that the I/O module is non-responsive to the data command. For example, the method 500 detects that the I/O module is non-responsive to a data command by starting a time-out window when the data command is sent and detecting that no response was received from the I/O module during the time-out window. In another example, the method 500 detects that the I/O module is non-response to a data command by receiving an error message from the I/O module, such as an SMP error, SES error, or a drive error. At block 505, the method 500 sends a control command through an out-of-band control path coupling the storage server to the I/O module, which is independent of the in-band path, to change the behavior of the I/O module. For example, the method sends a reset command through the out-of-band control path to reset the I/O module. The method 500 stores data indicating that the control command was sent to the I/O module and what type of control command was sent to the I/O module. The data can be stored in memory, for example, memory 315 on the storage server 400 in FIG. 3. FIG. 6 describes one embodiment of the storage server sending a control command through the out-of-band control path in greater detail below.

Returning to FIG. 5, at block 507, the method determines whether the I/O module is responsive to the method 500 sending the control command (at block 505). If the I/O module is responsive, the method 500 obtains status data of the I/O module from the I/O module through the out-of-band control path at block 509. The method queries an OOBCP processor on the I/O module for the status data stored in the memory coupled to the OOBCP processor. The I/O module status data includes post-data stored in the memory after the I/O module has been reset, such as connection data, I/O module firmware version data, I/O module logs, voltage status data, I/O module core dump data, and SAS address data. In other embodiments, the I/O module status data can include less or more types of data. At block 511, the method 500 sends the I/O module status data obtained from the memory on the I/O module to a device and the method completes. For example, the storage server outputs the I/O module status data to an external device (e.g., a printer, a display, a computer, a wireless device, a PDA, etc.) accessible to a user (e.g., an administrator). A user can use the I/O module status data to analyze one or more I/O modules.

In one embodiment, if the I/O module is still non-response (block 507) to the method 500 sending the control command (at block 505), the method 500 continues to block 513 to send a different control command through the OOBCP, such as a power cycle command that causes the I/O module to perform a hard reset. The method 500 stores data indicating that a different control command was sent to the I/O module and what type of different control command was sent to the I/O module. The data can be stored in memory, for example, memory 315 on the storage server 400 in FIG. 3. At block 515, the method 500 determines whether the I/O module is responsive to the different control command. If the I/O module is still non-responsive at block 515, the method 500 marks the I/O module as inoperative at block 517, and the method completes. If the I/O module is responsive after sending the different control command at block 515, the method obtains status data of the I/O module from the I/O module through the out-of-band control path at block 509. At block 511, the method 500 sends the I/O module status data obtained from the memory on the I/O module to a device and the method completes. In one embodiment, if the I/O module is not responsive at block 515 after sending the different control command, the method issues a control command to change the behavior of (e.g., reset or power cycle) other I/O modules in the same domain as the non-responsive I/O module.

In one embodiment, the method 500 changes the behavior (e.g., reset, power cycle) of multiple I/O modules in the same domain to recover non-responsive I/O modules. A domain is a number of I/O modules that are coupled to the same storage adapter in an in-band path, such as storage adapter 403 in FIG. 4. The method detects through the in-band path that a number of I/O modules are non-responsive to data commands. For example, the method detects that an error, such as an SMP error, SES error, or a drive error, has occurred on multiple I/O modules in the same domain and resets or power cycles the I/O modules that are in the domain.

FIG. 6 illustrates a flowchart for a method 600 for automatically controlling an I/O module to be performed by a storage server, such as storage server 400, according to one embodiment. At block 601, the method 600 obtains a Media Access Control (MAC) address of an OOBCP processor on each I/O module coupled to the storage server. When an I/O module in a storage shelf is coupled to a storage adapter in the storage server, the I/O module sends the MAC address of its OOBCP processor to the storage server. In an embodiment where the I/O module, such as I/O module 450-1A in FIG. 1, is coupled to a partner I/O module, such as I/O module 450-1B in FIG. 1, the I/O module 450-1A also sends the MAC address of the OOBCP processor of the partner I/O module 450-1B. At block 603, the MAC address data for each OOBCP processor coupled to the storage server is stored. In one embodiment, the MAC address data is stored as a mapping table (routing table) in memory on the storage server. The SES layer of the storage server tracks the MAC address data.

At block 605, the method 600 determines an Internet Protocol (IP) address for each port on a switch on each I/O module coupled to the storage server. The method monitors for incoming packet traffic from the ports. For example, the method sends a multicast packet requesting, from all of the I/O modules on the network, the IP address of each port. Each port sends a packet to the storage server including the IP address of the port and the MAC address of the OOBCP processor on the I/O module. The method 600 receives a packet from a port and checks the mapping table (MAC address table) stored at block 603, to determine if the MAC address table contains the MAC address of the OOBCP processor in the received packet. If the MAC address table does not contain the MAC address of the OOBCP processor, the method 600 ignores the packet. If the MAC address table does contain the MAC address of the OOBCP processor, the method assigns the IP address in the received packet to the MAC address of the OOBCP processor in the MAC address table. At block 607, the method 600 stores the assignment in the MAC address table to track that the IP address of this particular port on the I/O module corresponds to the MAC address of this particular OOBCP processor. In one embodiment, if the MAC address table already includes a corresponding IP address for a MAC address, the method 600 replaces the IP address already stored in the MAC address table with the IP address in the received packet if the IP address in the packet does not conflict with any IP address in the MAC address table. In one embodiment, a port sends a packet to the storage server including a MAC address, a null IP address (e.g., IP address 0.0.0.0), and a flag in the packet that is set to indicate the IP address is to be assigned. In this embodiment, the storage server assigns an IP address that is not being used and stores the assignment in the MAC address table at block 607.

At block 609, the method 600 sends a data command, such as a read command, through an in-band path coupling the storage server to an I/O module to access data stored in disks coupled to the I/O module. At block 611, the method detects through the in-band path that the I/O module is non-responsive to the data command. For example, the method encounters an SMP error, SES error, or a drive error to detect the I/O module is non-responsive to a data command. At block 613, the method determines from the error message the MAC address of the OOBCP processor on the I/O module that is non-responsive. At block 615, the method 600 determines the IP address of a port on the I/O module that corresponds to the MAC address by accessing the mapping table (MAC address table). At block 617, the method sends a control command (e.g., a reset command, power cycle command) changing the behavior of the I/O module through an out-of-band control path coupling the storage server to the I/O module to recover the I/O module and the method completes. In one embodiment, the method 600 changes the behavior of (e.g., resets or power cycles) multiple I/O modules that are in the same domain as the non-responsive I/O module to recover the non-responsive I/O module.

Figure 7:
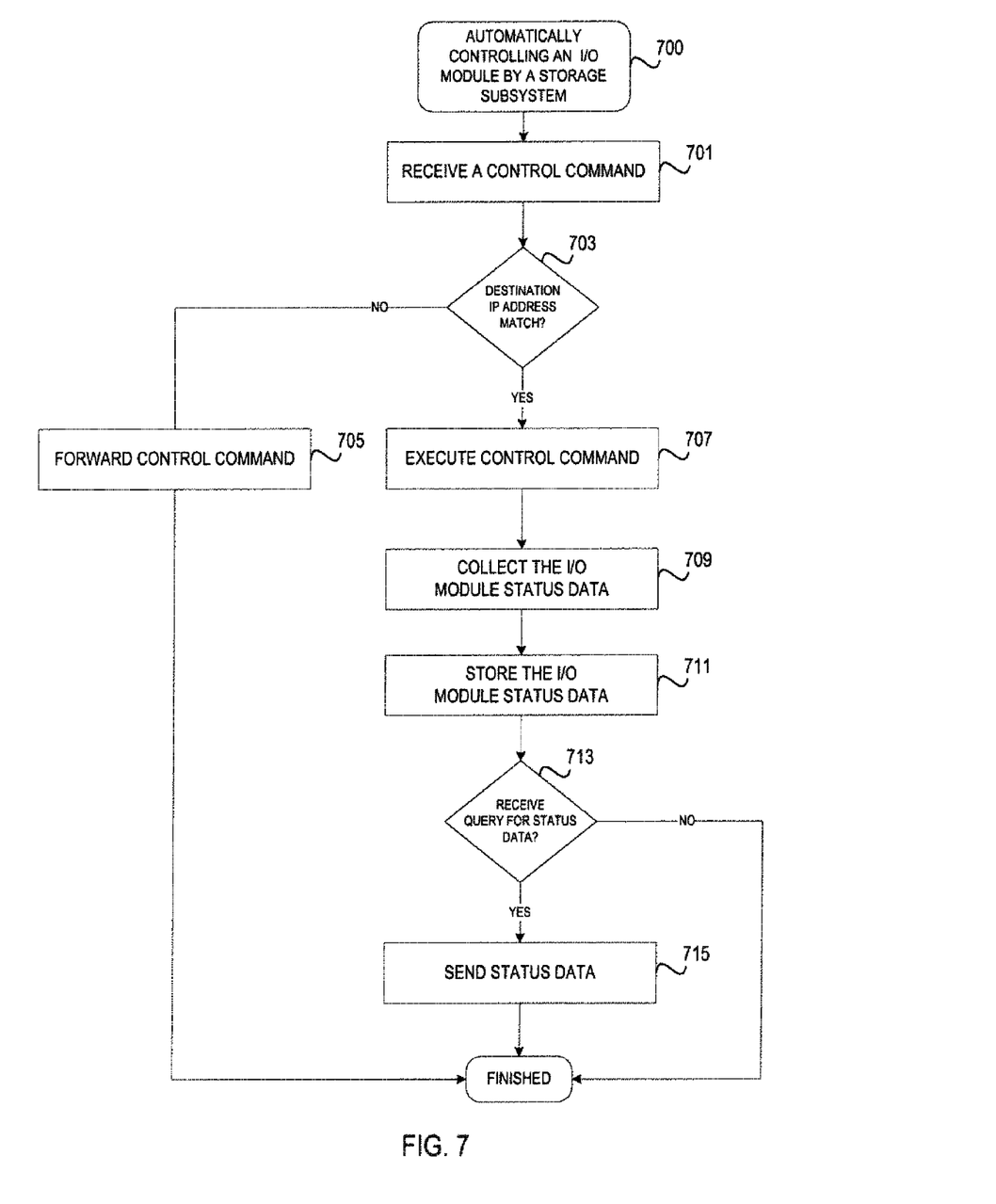
FIG. 7 illustrates a flowchart of a method for automatically controlling an I/O module to be performed by a storage subsystem according to one embodiment.

FIG. 7 illustrates a flowchart for a method 700 for automatically controlling an I/O module to be performed by a storage subsystem, such as storage subsystem 200, according to one embodiment. At block 701, the method receives a control command, such as a reset command, from a storage server through an out-of-band control path. For example, a port on an I/O module in a storage shelf in the storage subsystem receives the control command. At block 703, the method 700 determines whether the control command is addressed to the port receiving the control command. The control command includes the destination IP address of the destination port and information of the command type. For example, the information can indicate the command is a reset command or a power cycle command. The method determines whether the destination IP address included in the control command matches the IP address of the port receiving the control command. If the destination IP address does not match the IP address of the port receiving the command, the method 700 forwards the control command through an output port to another I/O module at block 705, and the method finishes. For example, an input port on an I/O module, such as I/O module 450-3 in FIG. 2, receives a signal (e.g., a reset command) addressed to an input port on another I/O module, such as I/O module 450-4 in FIG. 2. The method determines that the destination address in the reset command does not match the IP address of the port on I/O module 450-3, and the method forwards the reset command through an output port on I/O module 450-3 to be received by an input port on I/O module 450-4. The input port on I/O module 450-4 receives the reset command and determines that the destination IP address in the reset command matches its IP address. The signal can pass through a number of input ports and output ports on a number of I/O modules until the signal is received by the input port having an IP address that matches the destination IP address in the control command.

If the destination IP address matches the IP address of the port receiving the command, the method 700 causes the command to execute at block 707. For example, an input port of a switch on an I/O module receives a reset command having a destination IP address that matches the IP address of the input port that receives the control command. The OOBCP processor on the I/O module obtains the reset command from the switch and programs an OOBCP CPLD to program a data CPLD on the I/O module. The OOBCP processor programs the OOBCP CPLD by setting one or more bits in the bit map memory of the OOBCP CPLD. The OOBCP CPLD programs the data CPLD to cause a data processor on the I/O module to execute the reset command. The OOBCP CPLD programs the data CPLD by setting one or more bits in the bit map memory of the data CPLD. In another example, the control command may be a power cycle command. The OOBCP CPLD programs the data CPLD to cause the data processor to power cycle the I/O module.

At block 709, the method 700 collects status data of the I/O module. Examples of I/O module status data include connection data, I/O module firmware version data, I/O module logs, voltage status data, I/O module core dump data, and SAS address data. In other embodiments, the I/O module status data can include less or more types of data. At block 711, the method stores the I/O module status data. In one embodiment, the method stores the status data in memory in the I/O module coupled to an OOBCP processor in the I/O module. At block 713, the method 700 determines whether it receives a query through the out-of-band control path for the I/O module status data from, for example, the storage server. If the method does not receive a query for the status data, the method finishes. If the method receives a query for the status data, the method 700 sends the I/O module status data through the out-of-band control path to the storage server at block 715 and the method finishes.

In practice, the methods 500, 600, and 700 can constitute one or more programs made up of computer-executable instructions. Describing the method with reference to the flowcharts in FIGS. 5-7 enables one skilled in the art to develop such programs, including such instructions to carry out the operations (acts) represented by logical blocks 500 until 517, 600 until 617, and 700 until 715 on suitably configured computers (the processor of the computer executing the instructions from computer-readable media). The computer-executable instructions can be written in a computer programming language or can be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages can be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be further appreciated that more or fewer processes may be incorporated into the methods illustrated in FIGS. 5-7 without departing from the scope of the invention and that no particular order is implied by the arrangement of blocks shown and described herein.

A storage system comprising an Out-of-Band Control Architecture has been described. Although specific embodiments have been illustrated and described herein, it will be appreciated by those of ordinary skill in the art that any arrangement which is calculated to achieve the same purpose can be substituted for the specific embodiments shown. This application is intended to cover any adaptations or variations of the present invention.

Moreover, the description of FIGS. 1-4 is intended to provide an overview of computer hardware and other operating components suitable for performing the methods of the invention described above, but is not intended to limit the applicable environments. One of skill in the art will immediately appreciate that the invention can be practiced with other computer system configurations. The invention can also be practiced in distributed computing environments where tasks are performed by remote processing devices that are linked through a communications network.

It will be readily apparent to one of skill, that input/output devices, such as a keyboard, a pointing device, and a display, can be coupled to the storage manager. These conventional features have not been illustrated for sake of clarity.

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "computer-readable storage medium" includes any type of volatile or non-volatile storage device that is accessible by a processor.

Therefore, it is manifestly intended that this invention be limited only by the following claims and equivalents thereof.

What is claimed is:

1. A method comprising:
   sending, by a storage server, a data command to an I/O module in a storage subsystem to access data stored on disks in the storage subsystem;
   detecting, by the storage server, the I/O module is non-responsive to the data command, wherein the storage server detects the I/O module is non-responsive through an in-band path created by coupling the I/O module to a storage adapter in the storage server; and
   sending, by the storage server, a control command to the I/O module for causing behavior of the I/O module to change, wherein the storage server sends the control command through an out-of-band control path created by coupling the I/O module to a network adapter in the storage server.

2. The method of claim 1, wherein causing behavior of the I/O module to change includes causing the I/O module to reset, and wherein the control command is a command that resets the I/O module.

3. The method of claim 1, further comprising:
   determining, by the storage server, the I/O module is responsive to the storage server sending the control command; and
   obtaining, by the storage server, status data of the I/O module from the I/O module through the out-of-band control path.

4. The method of claim 3, wherein the I/O module status data comprises connection data, I/O module firmware version data, I/O module logs, voltage status data, I/O module core dump data, and SAS address data.

5. The method of claim 3, further comprising sending, by the storage server, the I/O module status data to a device.

6. The method of claim 1, further comprising:
   determining, by the storage server, the I/O module is non-responsive to the storage server sending the control command; and
   sending, by the storage server, a different control command through the out-of-band control path for causing the behavior of the I/O module to change.

7. The method of claim 6, wherein causing behavior of the I/O module to change includes causing the I/O module to power cycle, and wherein the different control command is a command that power cycles the I/O module.

8. The method of claim 1, wherein sending the control command comprises:
   determining, by the storage server, a media access control (MAC) address of an out-of-band control path (OOBCP) processor on the non-responsive I/O module;
   determining, by the storage server, an internet protocol (IP) address corresponding to the MAC address, wherein the IP address is for an input port on the non-responsive I/O module; and
   sending, by the storage server, the control command to the input port using the IP address as a destination IP address.

9. The method of claim 8, wherein determining the MAC address comprises:
   receiving, by the storage server, an error message including the MAC address of the OOBCP processor on the non-responsive I/O module; and
   obtaining, by the storage server, the MAC address from the error message.

10. The method of claim 8, wherein determining the IP address corresponding to the MAC address comprises accessing, by the storage server, data that maps the MAC address of the OOBCP processor on the non-responsive I/O module to the IP address of the input port on the non-responsive I/O module.

11. The method of claim 1, further comprising:
   receiving, by the storage subsystem, the control command from the storage server to change behavior of the I/O module in the storage subsystem, wherein the control command is received by a port on the I/O module in the storage subsystem through the out-of-band control path created by coupling the port on the I/O module to the network adapter in the storage server;
   determining, by the storage subsystem, the control command includes a destination IP address that matches an IP address of the port receiving the control command; and
   executing the control command to change the behavior of the I/O module.

12. A networked storage system comprising:
   a storage subsystem comprising an I/O module, wherein the I/O module comprises a switch having an input port to receive a control command for changing behavior of the I/O module, an out-of-band control path (OOBCP) processor to cause a data processor to execute the control command, and a data processor to execute the control command; and a storage server, coupled to the storage subsystem, to send the control command to the I/O module, wherein the storage server comprises a network adapter coupled to the input port of the switch on the I/O module in the storage subsystem and sends the control command through the network adapter.

13. The networked storage system of claim 12, wherein the I/O module further comprises:

a data complex programmable logic device (CPLD) to cause the data processor to execute the control command; and an OOBCP CPLD coupled to the data CPLD to program the data CPLD.

14. The networked storage system of claim 12, wherein the storage subsystem further comprises a plurality of disks coupled to the I/O module to store data, and the data processor is further to access the data stored on the plurality of disks, and the storage server further comprises a storage adapter coupled to the I/O module to send a data command to the I/O module for accessing the data stored on the plurality of disks and to receive a signal indicating the I/O module is non-responsive to the data command.

15. The networked storage system of claim 12, wherein the storage server further comprises a memory to store data that maps a media access control (MAC) address of the OOBCP processor on the I/O module to an IP address of the input port of the switch on the I/O module.

16. The networked storage system of claim 12, wherein the I/O module further comprises memory to store status data of the I/O module.

17. The networked storage system of claim 16, wherein the I/O module status data comprises connection data, I/O module firmware version data, I/O module logs, voltage status data, I/O module core dump data, and SAS address data.

18. An apparatus comprising:

a switch to receive a control command, wherein the control command is a command to change behavior of the apparatus;

an out-of-band control path (OOBCP) processor coupled to the switch to obtain the control command from the switch and to program an OOBCP complex programmable logic device (CPLD) based on the control command;

an OOBCP CPLD coupled to the OOBCP processor to program a data CPLD based on the control command;

a data CPLD coupled to the OOBCP CPLD to cause a data processor to execute the control command; and a data processor coupled to the data CPLD to execute the control command.

19. The apparatus of claim 18, wherein the switch comprises:

an input port to determine whether the control command includes a destination IP address that matches an IP address of the input port and to send the control command to the OOBCP processor if the destination IP address matches the IP address of the input port; and an output port to output the control command if the destination IP address does not match the IP address of the input port.

20. The apparatus of claim 18, wherein the control command is a command that resets the apparatus.

21. The apparatus of claim 18, wherein the data processor is further coupled to a plurality of disks to store data, and the data processor is further to receive a data command to access the data stored in the plurality of disks, to execute the data command, and to send an error message if the data processor is unable to access the data stored in the plurality of disks.

22. The apparatus of claim 18, wherein the OOBCP processor is further to obtain status data of the apparatus, and the apparatus further comprises memory to store the status data.

23. The apparatus of claim 18, wherein the switch is further to receive a different control command to change the behavior of the apparatus, the OOBCP processor is further to obtain the different control command from the switch and to program the OOBCP CPLD based on the different control command, the OOBCP CPLD is further to program the data CPLD based on the different control command, the data CPLD is further to cause the data processor to execute the different control command, and the data processor is further to execute the different control command.

24. The apparatus of claim 23, wherein the different control command is a command that power cycles the apparatus.

\* \* \* \* \*